United States Patent [19]
Brown

[11] Patent Number: 6,082,368
[45] Date of Patent: Jul. 4, 2000

[54] NICOTINE CANDY CIGARETTE

[76] Inventor: Graham H. Brown, 15032 Hanover La., Huntington Beach, Calif. 92647

[21] Appl. No.: 08/926,344

[22] Filed: Sep. 9, 1997

Related U.S. Application Data

[63] Continuation-in-part of application No. 08/672,612, Jun. 28, 1996, abandoned, which is a continuation-in-part of application No. 08/399,202, May 8, 1995.

[51] Int. Cl.$^7$ ..................................................... A24F 47/00
[52] U.S. Cl. ......................... 131/270; 131/271; 131/329; 131/359; 424/197.1; 424/440; 424/441; 424/464; 424/473; 424/474; 424/480; 426/5; 426/106; 206/236; 206/237
[58] Field of Search .................................. 131/270, 271, 131/359, 329, 330; 424/197.1, 435, 439, 440, 441, 464, 473, 474, 475, 480; 206/236, 256, 237, 242; 426/5, 106, 108, 119, 127

[56] References Cited

U.S. PATENT DOCUMENTS

| | | |
|---|---|---|
| 904,521 | 11/1908 | Ellis . |
| 1,550,966 | 6/1925 | Kappes . |
| 2,346,087 | 4/1944 | Sevastopulos . |
| 3,236,369 | 2/1966 | Moore ..................................... 426/119 |
| 3,584,630 | 6/1971 | Inskeep . |
| 4,774,971 | 10/1988 | Vieten . |
| 4,800,903 | 1/1989 | Ray et al. . |
| 5,048,544 | 9/1991 | Mascarelli et al. . |
| 5,387,416 | 2/1995 | White et al. .......................... 424/197.1 |

OTHER PUBLICATIONS

Richmond, Walter, Candy Production, Methods and Formulas, pp. vii–x, 2–3, 481–485, 1948.
Candy Production Methods and Formulas (Feb. 14, 1949).
Dangerous Properties of Industrial Materials (4th Ed) N. Irving Sax.

*Primary Examiner*—Stanley S. Silverman
*Assistant Examiner*—Michael P. Colaianni
*Attorney, Agent, or Firm*—Curtis L. Harrington

[57] ABSTRACT

A nicotine candy is provided for consumption in small volumes and in a cigarette shaped package. Each portion of the candy is obtained by removing it from a cigarette shaped package from the end. In a first embodiment, standard paper is used to wrap the a series of linearly disposed candy portions. In a second embodiment, the package is made of edible rice paper, and may be torn off of the end in a single piece. The formulation of the candy preferably uses a food grade Beta-pyridyl-alpha-N-methylpyrrolidine dissolved into any standard hard sugar candy. This material is water soluble and is admixed into the sugar candy composition during candy formation. Preferably, the candy composition is available in a range of strengths which further enables users to regulate their doses. One or two or three pieces can be ingested simultaneously to enable control of the intake, in addition to the availability of the composition in different strengths.

11 Claims, 3 Drawing Sheets

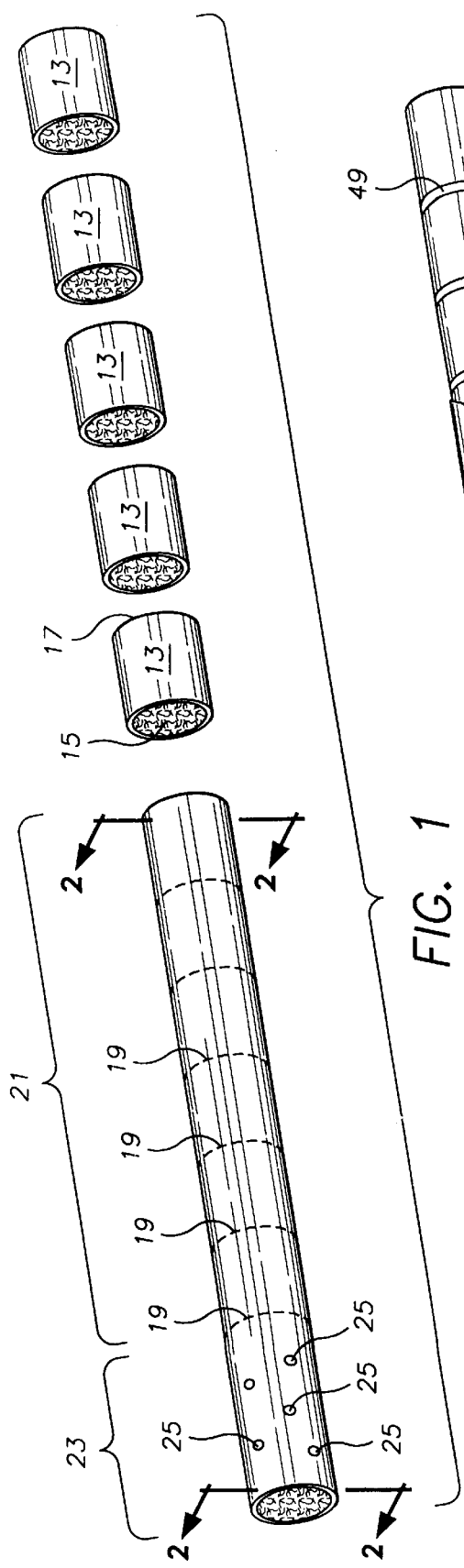
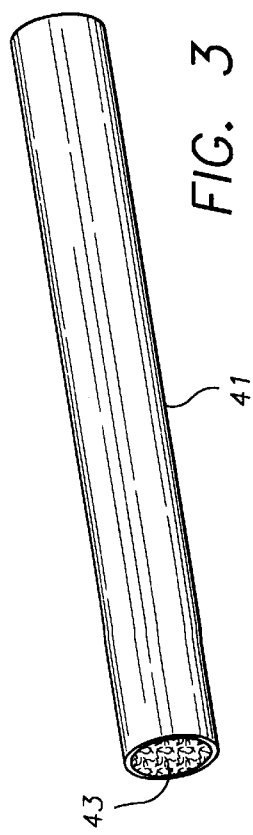
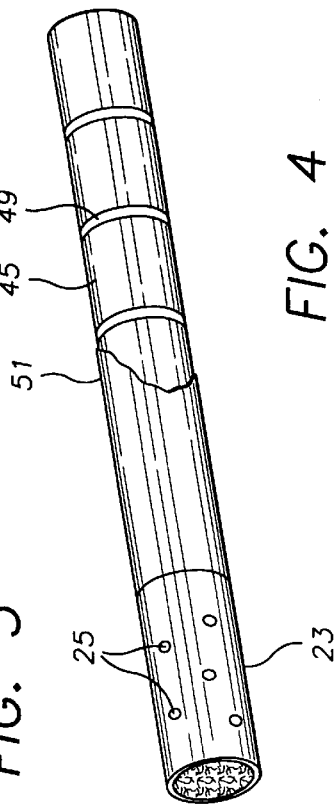

NICOTINE CANDY CIGARETTE

This is a continuation-in-part of U.S. patent application Ser. No. 08/672,612 filed Jun. 28, 1996 now abandoned, which was a continuation-in-part of copending U.S. patent application Ser. No. 08/399,202 filed on May 8, 1995.

FIELD OF THE INVENTION

The present invention relates to the field of chemical and sensory delivery systems, and more particularly to a nicotine candy and packaging which will satisfy both the craving for nicotine as well as the sensory inputs for cigarette consumption, and includes two embodiments for providing a nicotine delivery mechanism.

BACKGROUND OF THE INVENTION

A number of mechanisms are available to assist in smokeless delivery of nicotine to smokers who have acquired the need for such substance in their system. The smokeless nicotine delivery system is needed for a variety of strategies to help smokers deal with a variety of circumstances. For those who need or want to quit, a cessation therapy which involves an alternative delivery system can assist the smoker in tapering off and quitting. Smokers who continue to have the need for nicotine, even where they are unwilling or do not want to quit, need to have nicotine delivery in situations where smoking is unacceptable.

There have been external patches for placement on the skin which delivers a timed stream of nicotine in skin permeable form. Side effects of this transdermal delivery approach has included skin irritation, rashes and difficulty in controlling the delivery rate of the nicotine.

One of the most recent forms of delivery of nicotine has been as a resin form and for delivery in chewing gum. However the gum generally has an unacceptable taste and is available in two strengths. A strong nicotine contains four milligrams in a stick, while a medium strength stick contains two milligrams. The gum delivers a relatively strong dose at the beginning and trailing off as the chewing time progresses. This does not enable a steady delivery, and the availability of the gum in only two strengths does not allow a user to use a fading approach by reducing the strength of nicotine intake over time.

Another severe shortcoming of both the transdermal and the chewing gum approaches is the absence of the physiological analog of the smoker's habit. One of the most severe elements missing from therapy to substitute nicotine is the manipulation and handling of the cigarette itself. As an example, U.S. Pat. No. 5,048,544 to Mascarelli et al discloses the use of a nicotine candy on a stick. The Macarelli disclosure teaches a very low amount of nicotine on the order of 0.1 mg for an entire sucker, but does not teach how to make the invention. Although the nicotine candy of Mascarelli were available, even though he does not teach how to make it, the use of a sucker form is simply too great a departure from the physical form and handling of cigarettes to which the user is accustomed.

In practical terms, for those who are used to working while they smoke, a smoker cannot easily handle a sucker structure during work. Either the sucker structure is in the hand leaving only one hand free, or it needs to be placed in a rest position. It cannot be placed on a table or other desk surface since it would instantly pick up debris. Providing a holder is similarly restrictive. In addition, the sucker cannot be held and at the same time allow the hand holding the sucker to be otherwise engaged, as is the case for a cigarette which can be held between two fingers. In short, the sucker form is totally unacceptable for the user, as has been evidenced by the absence of such a device on the market in the past six years.

What is therefore needed is a delivery system which enables delivery of nicotine and has all of the ease and natural physiological effects of smoking. The needed delivery system should enable more control over the dosage of nicotine per unit time similarly approximating the smoking of a cigarette.

SUMMARY OF THE INVENTION

A nicotine candy is provided in small volumes and in a cigarette shaped package. Each portion of the candy is obtained by removing it from a cigarette shaped package from the end. In a first embodiment, standard paper is used to wrap the a series of linearly disposed candy portions. In a second embodiment, the package is made of edible rice paper, and may be torn off of the end in a single piece.

A first embodiment of the formulation of the candy preferably uses a food grade Beta-pyridyl-alpha-N-methylpyrrolidine dissolved into any standard hard sugar candy. This material is water soluble and is admixed into the sugar candy composition during candy formation. Preferably, the candy composition is available in a range of strengths which further enables users to regulate their doses. One or two or three pieces can be ingested simultaneously to enable control of the intake, in addition to the availability of the composition in different strengths.

A second embodiment of the formulation of the candy involves the use of a fine to superfine powder formed from crushing or finely grinding tobacco leaves. A hard candy is formed from sugar, water and direct addition of the leaf powder which forms a dispersion throughout the hard candy mass. The leaf powder is ingested directly by the user as the candy material is dissolved.

BRIEF DESCRIPTION OF THE DRAWINGS

The invention, its configuration, construction, and operation will be best further described in the following detailed description, taken in conjunction with the accompanying drawings in which:

FIG. 1 is a perspective view of an exploded view of the nicotine candy packaging of the present invention with an air filter;

FIG. 3 illustrates a second embodiment of the packaging of the present invention shown in exploded view without air filter and with a continuously wrapped candy container shown partially in section;

FIG. 4 illustrates an exploded view of a continuous length of nicotine candy having a series of continuous circular grooves used to separate the candy and fittable within a tube of edible rice paper as the nicotine candy package;

DETAILED DESCRIPTION OF THE PREFERRED EMBODIMENT

Figure 2:
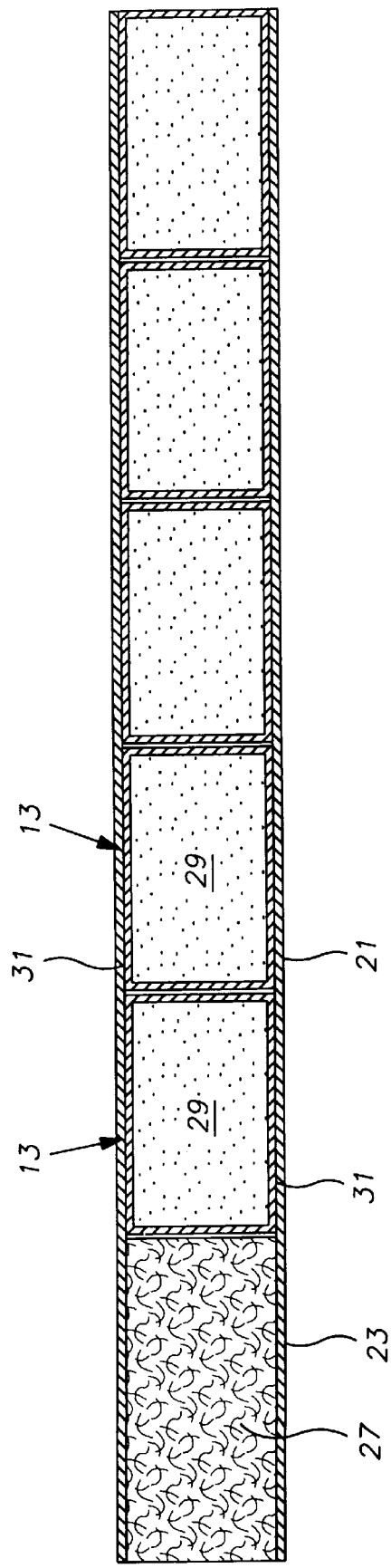
FIG. 2 is a sectional view taken along line 2—2 of FIG. 1 and illustrating the internals of the package of FIG. 1, but in assembled form.

Nicotine delivery structures should preferably be no more amenable to abuse than cigarettes. Because of the toxicity of nicotine the delivery structure should be as safe and as identifiable as possible. The packaging and delivery method disclosed herein accomplishes several objectives in its simulation of cigarettes and cigarette packaging.

First and most importantly, the use of packaging which is identical in size and appearance to cigarette packs and individual cigarettes themselves enables users who are trying to quit to have a minimal disruption in their habit pattern as they slowly and deliberately self reduce their dosage of nicotine. For those not seeking to quit smoking and who are in situations where smoking is not possible nor appropriate, having the nicotine substitute in a familiar structure causes a lessened sense of deprivation of the act of smoking.

In both cases, individuals reach for the familiar pack of cigarettes, tap out an individual cigarette shaped tube, complete with filter tip, which can be held between the fingers. The end of the package can be torn off to yield a foil wrapped, two gram mass of nicotine permeated hard sugar candy which can be ingested over time orally. While ingesting the candy and nicotine as the candy is manipulated in the oral cavity, the user can continue with the feel and manipulation of the cigarette packaging. In one embodiment, the packaging is fitted with a filter section having a series of circumferentially distributed holes. The user can orally draw air from the end of the packaging, which feeds through the circumferentially distributed holes and which will give the same feel as orally drawing smoke through a filtered cigarette.

In the filter structure can be located various flavors for airborne delivery, including menthol, wintergreen, and the like to further enhance the closeness of handling the packaging like a cigarette to the actual smoking of a menthol cigarette. The holes in the periphery of the filter section can be restricted to a greater or lesser extent to restrict the airflow to simulate long thin cigarettes which have more airflow resistance or short, larger diameter cigarettes which have less airflow resistance.

Secondly, and also very important is that the packaging is designed to lessen the chance for the packaged product to be mistaken for ordinary candy.

Since nicotine is addicting and dangerous in large doses, accidental ingestion by children and pets, care must be taken to insure that it will not be ingested by other than an informed adult. In children, nicotine ingestion can cause nausea, vomiting, lethargy abdominal pain, hypotension, agitation and tachycardia. In some instances ingestion of the nicotine can be fatal. Also, nicotine should not be ingested by pregnant women.

The packaging of the candy in a cigarette container, and the further packaging of the cigarette containers in a cigarette container package provides a series of advantages in this instance. First, the package may be sold in vending machines which also vend cigarettes in packages of the same size. This will help to insure that the vending machine channel of distribution will at least be no less secure against minors than the sale of cigarettes.

Further, the appearance of the packaging, either in the form of the pack of containers, or in the form of the cigarette container itself will be a further visual warning to children who have been taught not to touch cigarettes and cigarette materials.

The description and operation of the invention will be best described with reference to FIG. 1. FIG. 1 illustrates an exploded view of a nicotine candy package 11 having a linear grouping of single wrapped hard candies 13. Preferably the single wrapped hard candies 13 are cylinder shaped and terminate at their ends 15 and 17 so as to form as close a relationship as is possible to take maximum advantage of the space within the nicotine candy package within which the single wrapped hard candies 13 fit.

A series of perforations 19 are seen extending circumferentially around the nicotine candy package 11 to enable a clean manual removal of each section of the nicotine candy package 11 which exists between the perforations. Perforating the nicotine candy package 11 enables easier manual removal of the sections to keep the other single wrapped hard candies in tact until they are manually removed by the user.

The nicotine candy package 11 is subdivided into a candy carriage portion 21 and a filter portion 23. The filter carriage portion 23 can be arranged internally as a standard cigarette filter, however, it is clear that the presence of the single wrapped hard candies 13 in the candy carriage portion 21 will prevent any air flow from passing through even a standard cigarette filter. To enable the ability to draw air through the filter carriage portion 23, a series of small apertures 25 are circumferentially and axially distributed to enable air to be drawn from the area surrounding the nicotine candy package and through any filter structure located inside the filter carriage portion 23.

Preferably the filter carriage portion 23 will be colored differently than the candy carriage portion 21 as is the case with a regular cigarette.

Referring to FIG. 2, a sectional view taken along line 2—2 of FIG. 1 gives an illustration of the inside of the nicotine candy package 11 of FIG. 1. At the left side a fibrous filter 27 is located within the filter carriage portion 23. To the right of the filter 27, the single wrapped hard candies 13 are located.

Each of the single wrapped hard candies 13 include a mass of nicotine candy 29 wrapped in what is preferably a water and moisture impermeable material wrap 31. The individual wrap 31 about each of the nicotine candy masses 29, will serve to keep it fresh and non-sticky.

Five nicotine candy masses 29 are shown although a greater or lesser number can be included. After all, since it is the cigarette package being simulated, and cigarettes differ in size and shape, it is expected that the invention may vary in size.

In the use of the nicotine candy package 11, the user can hold the package 11 in the same manner as a cigarette. The user can tear off the outer paper making up the candy carriage portion 21 to expose the single wrapped hard candies 13 one at a time.

The user can also orally draw air through the filter 27. The filter 27 is preferably permeated with a chemical which can be released in air drawn through the filter 27, such as menthol, wintergreen, or peppermint, to name a few. All of these structures enable the user to manipulate the nicotine candy package 11 as he would a cigarette, sequentially eat the single wrapped hard candies 13, and occasionally orally draw flavored air through the filter 27.

Referring to FIG. 3, a second embodiment is shown in exploded form and including a plain nicotine candy package 41 having a closed end 43. In this embodiment, a single elongate cylinder of nicotine candy 45 is wrapped within an elongate wrapper 47. The elongate wrapper 47 is shown partially broken away to expose the single elongate cylinder of nicotine candy 45. The single elongate cylinder of nicotine candy 45 has a series of circumferentially outwardly disposed grooves 49 to help the user to separate and demark individual masses of nicotine candy from the single elongate cylinder of nicotine candy 45 to help the user limit the dosage.

The user can tear the material of the plain nicotine candy package 41 along with the elongate wrapper 47 without the aid of perforations 19 shown in FIG. 1. The plain nicotine candy package 41 can be made out of paper, and the elongate wrapper 47 can be made of a waxed paper to help isolate the single elongate cylinder of nicotine candy 45 from moisture.

Referring to FIG. 4, a third embodiment is shown wherein a simple nicotine candy package 51 is shown partially in section and exposing the single elongate cylinder of nicotine candy 45 having the same series of circumferentially outwardly disposed grooves 49 and which was shown in FIG. 4. In this case, the simple nicotine candy package 51 is made of rice paper and individual pieces of the single elongate cylinder of nicotine candy 45 can be bitten or manually broken off of the main body of the simple nicotine candy package 51.

From a use standpoint this is the more simplistic approach since the end of the simple nicotine candy package 51 can be bitten off directly. Also shown in the FIG. 4 is the optional filter carriage portion 23 which can work with the simple nicotine candy package 51 in the same manner as was described in FIGS. 1 and 2. The embodiment of FIG. 4 can also be used for menthol candy and other types of candy which may be broken or torn from the simple nicotine candy package 51 and the underlying single elongate cylinder of nicotine candy 45.

Figure 5:
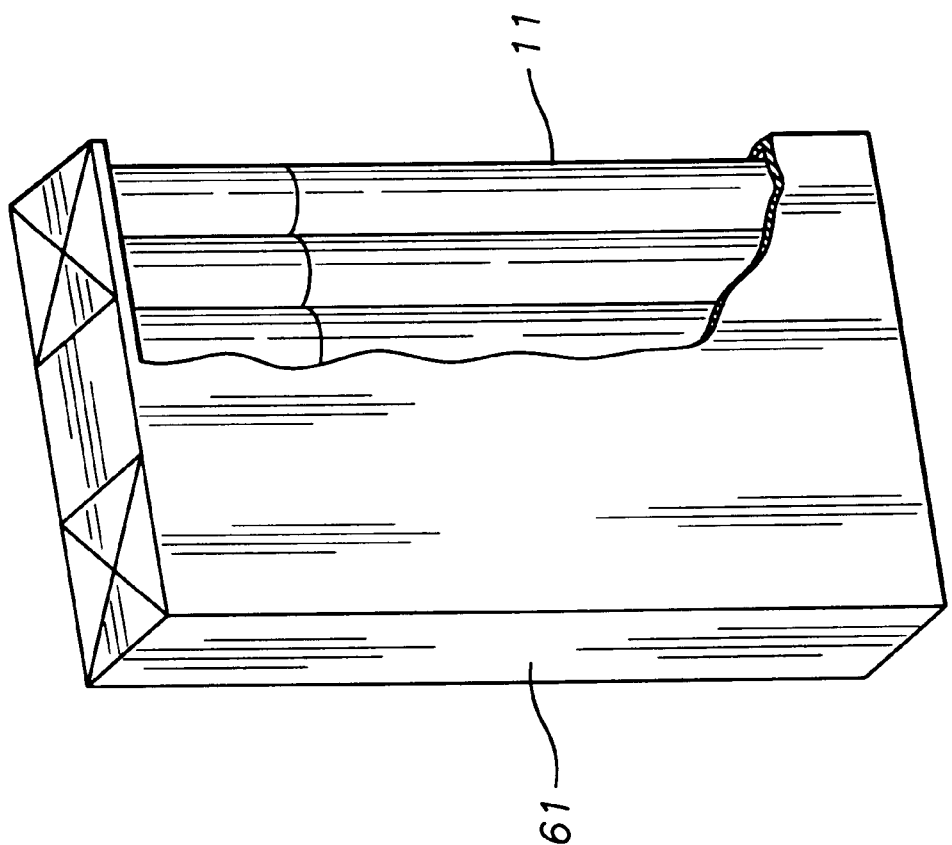
FIG. 5 shows a partially broken away view of a standard cigarette package and illustrating the individual cigarette shape nicotine candy packages 11 of the present invention.

Referring to FIG. 5, a cigarette pack 61 package is shown in broken away view and illustrated as containing a standard number of nicotine candy packages 11, 41, or 51. In this manner, the nicotine candy 29 and 45 can be sold in vending machines which accept standard sized cigarette packages. Also, children will be far less apt to tamper with a structure usually identifiable as off limits.

Figure 6:
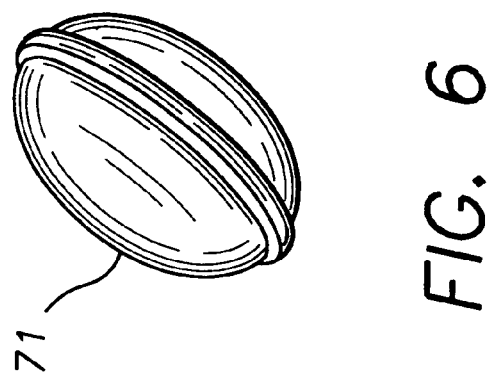
FIG. 6 illustrates a hard candy drop especially shaped for use as a substitute for chewing tobacco and where the packaging of FIGS. 1–5 is not convenient nor appropriate.

Referring to FIG. 6, a hard nicotine candy drop 71 is illustrated and specially shaped to be held in the mouth as a substitute for chewing tobacco. This drop 61 can be supplied in any packaging which is effective to keep moisture.

It is important to insure that the dosage or strength of the nicotine in the candy is consistently uniform. The preferred source of nicotine is a food-grade product of Beta-pyridyl-alpha-N-methylpyrrolidine which is currently commercially available from Torcan Chemical Ltd of 110 Industrial Parkway North, Aurora, Ontario, Canada L4G 3H4. This is a clear colorless liquid available at 99.4% purity. The material is soluble to the extent of one gram in 10 milliliters of water. Since the strength of the candy is at the milligram range, the solubility is not a problem to formulation.

The pure product can be diluted step wise to yield the proper strength for addition to the hard candy formulation. The details of making sugar candy will be omitted from the discussion, since it is well known and because the details vary in the type of sugar used, etc. In general, a sugar and water mixture is formed at a relatively high temperature, up to the boiling point of the mixture. The liquid mixture will have enough concentration of sugar that it will harden when it is reduced to room temperature.

The level of hardness at room temperature, as well as the degree of solubility during makeup at high temperature will depend upon the number of additives in the mixture. Some flavors can affect the hardening characteristic, and where flavoring would soften the candy, more sugar may be added to the mixture to increase the sugar to water ratio to counter any softening effects of flavor additives. Other flavoring additives may have a greater or lesser effect, such as menthol, mint and peppermint. Sugars available to make hard candy include corn sugar and table sugar, to name a few.

The strength of the nicotine should be diluted with water down to a level such that the water and nicotine mixture can be added to the sugar in the same manner in which water would be added to make conventional sugar candy. Contemplated are different types of shapes and colors of candy, along with different optical qualities.

In the alternative, a nicotine extraction of tobacco can be performed by boiling tobacco leaves in water and then separating the leaves from the water containing the extract. With this technique, the final concentration in the water would depend upon boiling temperature, pressure, time of exposure, strength of tobacco in the leaves of tobacco, and other factors. With this technique, the source of the nicotine and water make up for the candy would have to be monitored closely to insure a uniform product.

One method of for testing the strength of the resulting solution is by high pressure chromatography. Other methods are available. It is important, however, to insure that the strength is known and uniform. A non-uniform strength would give people trying to quit a disruption of their tapering off schedule, for example.

A strength of nicotine in the nicotine and water mixture should be formulated in order to yield a strength of nicotine in the finished product in the range of between 0.0025 milligrams of nicotine per gram of hard candy to about two milligrams of nicotine per gram of hard candy. In the preferred embodiment, each piece of hard candy would weight about 2 grams.

In one formulation of nicotine candy using sugar and having 1 mg of nicotine per gram of candy, 1,200 ml or g of butter of melted butter is added to 4,800 ml (4,000 g)of granulated cane sugar. The butter and cane sugar are mixed in with 1,800 ml of hot water. 1,200 ml of light corn syrup is added and the mixture as it is stirred and heated to 278 degrees Fahrenheit, and adding 8.25 grams of liquid nicotine. About 50 ml of flavoring may be added, such as lemon juice and the like. Pour into molds and allow to harden at room temperature.

A sugar-free recipe involves 2.320 KG of Lycasin,a sugar-free substitute which is heated to 285 degrees Fahrenheit and the liquid stirred. Next is added 1.340 KG of salted dairy butter and 0.006 KG of lecithin. Stirring is continued and the heat is maintained at 275 degrees Fahrenheit, and adding 3.72 grams of liquid nicotine. Continue stirring and raising the heat until the color is a light golden brown at approximately 350 degrees forehead. Add up to about 50 ml of flavoring such as lemon juice. Pour into molds and allow to harden at room temperature.

A second embodiment of the composition involves the use of fine or superfine ground tobacco leaves. As a powder, the tobacco can be ingested directly into the body like snuff or chewing tobacco, but where the organic plant material as a whole is ingested. The preferable ratio is about 36 grams of dried tobacco leaves per 26 pounds of candy. In the case of an individual who chews tobacco, and has the need for higher nicotine content, the candy may have a concentration of tobacco leaves as high as 72 grams per 26 pounds of candy. Where the tobacco leaves are not completely dry, this ratio should be adjusted to take account of the moisture content in the leaves.

Where the powdered leaves are distributed throughout the sugar and water portion of the candy, and especially where the mixture is made at a temperature of from about 300° Fahrenheit to about 400° Fahrenheit, some compounds from the tobacco leaf are expected to go into the candy solution. As such, the amount of nicotine in the solution versus the amount left in the powdered leaf material may depend upon the time, temperature and order of processing.

The candies formed are preferably about 2.0 grams in weight and each have preferably about 2.0 milligrams of nicotine per 2.0 gram candy, or 1.0 milligram of nicotine per gram of candy. The 36 gram of tobacco leaf per 26 lbs of candy is believed to equate to about 6.0 or so milligrams of tobacco leaf per single 2.0 gram candy. This is considered to be a median dosage, and the range of dosages is as described above in the range of between 0.0025 milligrams of nicotine per gram of hard candy to about six milligrams of nicotine per gram of hard candy for a high dose. This would equate to about 1/200 as much leaf on the low end, or about 0.03 milligram of tobacco leaf per 2.0 gram candy, or about 0.015 milligram of tobacco leaf per gram of candy. On the high end, this equates to about 12.0 milligram of leaf per 2.0 gram candy, or 6.0 milligram of leaf per gram of candy. This higher concentration may be necessary to satiate the need for nicotine intake among tobacco chewers. Because the powdered tobacco leaved are a dispersion, changes in the concentration of the powdered tobacco leaves will have little effect on the amount of total water to sugar ratio.

In the median formulation described, 36 grams of superfine powdered tobacco leaf powder is added to about 7.0 lbs of water, and boiled to assist in dissolution of the sugar, which is preferably granulated cane sugar. The amount of sugar will be about 19.0 lbs but will be varied according to the hardness of the resulting candy which is desired. The temperature of the boiling mixture will rise as the sugar is added. Some candy makers go by the boiling temperature, while some follow a strict recipe. Remember also that the water is evaporating as the sugar is being dissolved. Where the heat source is limited, the mixing process may take additional time.

The resulting product may have a grainy feel to the tongue, and depending upon how much time and temperature is applied to the boiling mixture, the nicotine will probably reside in both the candy's water sugar matrix, as well as in the bits of powdered leaf which can be detected by the tongue at the dissolution interface. As in the recipe set forth for direct addition of nicotine liquid, the powdered leaf composition may include butter and other flavorings. In addition, the powdered leaf embodiment can also be used in a sugar-free recipe with Lycasin, a sugar-free substitute which may be heated to 285 degrees Fahrenheit and the liquid stirred, as the powdered tobacco is added in accord with the objective of having a median 2.0 gram candy to contain 2.0 milligram of nicotine.

While the present invention has been described in terms of a candy-style nicotine delivery device, as well as structures for satisfying the psychological comfort of the smokers as a substitute for smoking, one skilled in the art will realize that the structure and techniques of the present invention can be applied to many similar devices. The present invention may be applied in any situation where the user seeks to substitute acceptable consumptive behavior for unacceptable behavior with the minimum disruption and maximum comfort familiarity to the user.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A packaged solid nicotine candy comprising:
   a solid nicotine candy further comprising a mixture of:
   a sugar,
   water, and
   beta-pyridyl-alpha-N-methylpyrrolidine, said mixture forming a solid at room temperature as a solid nicotine candy which is water soluble;
   an elongate tubular container having a first end and a second end, said elongate tubular container having a barrier at said first end;
   a vapor impermeable wrap surrounding said solid nicotine candy to form a single wrapped hard candy and further including a plurality of said wrapped hard candies carried within said elongate tubular container in a linear orientation extending from said second end and toward said first end of said elongate tubular container, and wherein said barrier is a filter carried within a portion of said elongate tubular container and wherein the portion of said elongate tubular container surrounding said filter is perforated to enable air to be drawn through said perforations and to the first end of said elongate tubular container.

2. The packaged solid nicotine candy of claim 1 wherein the filter has applied a substance from the group consisting of:
   menthol,
   wintergreen, and
   peppermint; and wherein said substance will vaporize when air is drawn through said filter.

3. The packaged solid nicotine candy of claim 1 wherein said elongate tubular container has a series of circumferential perforations spaced in accord with said linear orientation of said plurality of said wrapped hard candies carried within said elongate tubular container to form a plane existing between adjacent ones of said single wrapped hard candy.

4. The solid nicotine candy of claim 1 wherein said candy is formed in the shape of an elongate cylinder, and having a size approximating that of a cigarette.

5. The solid nicotine candy of claim 4 wherein said elongate cylinder shaped candy has a series of circumferentially outwardly disposed grooves to facilitate breaking of the nicotine candy into individual portions.

6. A packaged solid nicotine candy and including the solid nicotine candy of claim 5 and wherein said elongate tubular container is a vapor resistive edible rice paper surrounding said elongate cylinder shaped solid nicotine candy to form a single wrapped hard candy encased in edible rice paper.

7. The packaged solid nicotine candy of claim 6 wherein said elongate tubular container has a series of circumferential markings spaced in accord with said orientation of said plurality of circumferentially outwardly disposed grooves.

8. The packaged solid nicotine candy of claim 7 wherein the filter has applied a substance from the group consisting of:
   menthol,
   wintergreen, and
   peppermint; and wherein said substance will vaporize when air is drawn through said filter.

9. A packaged solid nicotine candy comprising:
   a solid nicotine candy further comprising a mixture of:
   a sugar,
   water, and
   beta-pyridyl-alpha-N-methylpyrrolidine, said mixture forming a solid at room temperature as a solid nicotine candy which is water soluble, and wherein said candy is formed in the shape of an elongate cylinder, and having a size approximating that of a cigarette, and wherein said elongate cylinder has a series of circumferentially outwardly disposed grooves to facilitate breaking of the nicotine candy into individual portions;

an elongate tubular container having a first end and a second end, said elongate tubular container having a barrier at said first end;

a vapor impermeable wrap surrounding said elongate cylinder shaped solid nicotine candy to form a single wrapped hard candy and carried within said elongate tubular container, and wherein said barrier is a filter carried within a portion of said elongate tubular container and wherein the portion of said elongate tubular container surrounding said filter is perforated to enable air to be drawn through said perforations and to the first end of said elongate tubular container.

10. The packaged solid nicotine candy of claim 9 wherein the filter has applied a substance from the group consisting of:

menthol, wintergreen, and peppermint; and wherein said substance will vaporize when air is drawn through said filter.

11. The packaged solid nicotine candy of claim 10 wherein said elongate tubular container has a series of circumferential perforations spaced in accord with said orientation of said plurality of circumferentially outwardly disposed grooves.

* * * * *